United States Patent [19]

Baumler et al.

[11] Patent Number: 5,576,900
[45] Date of Patent: Nov. 19, 1996

[54] ADJUSTABLE REAR VIEW MIRROR ASSEMBLY FOR TRUCKS

[76] Inventors: Thomas K. Baumler, 12375 Oak Park Blvd. NE., #205, Blaine, Minn. 55434; Raymond P. Baumler, 4161—149 "R" Ave. SE., Wheatland, N. Dak. 58079

[21] Appl. No.: 372,145

[22] Filed: Jan. 13, 1995

[51] Int. Cl.[6] .............................. G02B 7/182; B60R 1/06
[52] U.S. Cl. ...................... 359/872; 359/881; 359/865; 248/479; 248/484
[58] Field of Search ................................ 359/841, 850, 359/855, 856, 865, 872, 881; 248/476, 479, 480, 484

[56] References Cited

U.S. PATENT DOCUMENTS

| | | | |
|---|---|---|---|
| 2,413,894 | 1/1947 | Sorensen | 359/855 |
| 3,476,464 | 11/1969 | Clark | 359/850 |
| 4,049,228 | 9/1977 | Skewis | 248/480 |
| 4,156,557 | 5/1979 | Skewis | 359/855 |
| 4,486,075 | 12/1984 | Cohen | 359/865 |
| 4,664,489 | 5/1987 | Karns . | |
| 4,758,078 | 7/1988 | Bracamonte | 359/881 |
| 4,804,257 | 2/1989 | Schmidt et al. | 359/865 |
| 4,940,320 | 7/1990 | Tribble | 359/855 |
| 5,119,241 | 6/1992 | Rutten | 359/881 |

FOREIGN PATENT DOCUMENTS 0120430  9/1981  Japan ..................... 359/865

*Primary Examiner*—Ricky D. Shafer
*Attorney, Agent, or Firm*—David A. Lingbeck

[57] ABSTRACT

An adjustable rear view mirror assembly for trucks comprising a pair of sleeves fastened to a conventional side mirror on a truck, a mirror support slidably and rotatably mounted through the sleeves, and a mirror pivotally connected to an end portion of the mirror support and disposed in an operable position above the truck box so that a user seated in the cab of the truck can rotate the mirror support to adjust the mirror and to see most any part inside the truck box.

2 Claims, 5 Drawing Sheets

ADJUSTABLE REAR VIEW MIRROR ASSEMBLY FOR TRUCKS

BACKGROUND OF THE INVENTION

This invention relates to an adjustable rear view mirror assembly for trucks which essentially have boxes into which the rear view mirror assembly allows the user to see from the cab of the truck. This invention is particularly useful for users who have trucks used for carrying and transporting grain in the boxes, and allows the users to view inside the boxes and should not be used during movement of the trucks themselves.

Rear view and side view mirrors have been known and used for years and are legally required on vehicles where the rear views are obstructed by boxes, trailers, or the like. There are side mirrors fixedly mounted to the sides of the cabs of trucks and to the sides of other vehicles such as cars. These mirrors allow the users to see what's behind them. In the prior art, there are also mirror systems which allow the users to look directly into the boxes of trucks while being seated in the cabs. However, as will be described, these mirror systems are difficult to set up and very complex and difficult not only to use but also to adjust.

One known prior art is a REAR VIEW MIRROR STRUCTURE, U.S. Pat. No. 2,085,000, INVENTED BY ANTONE S. BORBA & GEORGE T. EDWARDS, which comprises a bracket, a tubular section attached to the top of an automobile, a slidable rod section mounted in the tubular section, a semi-spherical shield attached to the upper end of the rod section, a mirror adjustably mounted in the shield, and a spring means to hold the bracket in a vertical position.

Another known prior art is an ARTICULATED REAR VIEW MIRRORS FOR A TRACTOR-TRAILER, U.S. Pat. No. 3,208,343, INVENTED BY LEROY W. PROCHNOW, which comprises a series of mirrors mounted on brackets which are attached not only to the cab of the truck but also to the trailer. The mirrors must be carefully adjusted and must be in synchronization to one another in order for the series of mirrors to work effectively.

Another known prior art is a REAR VIEW MIRROR FOR AUTO BUMPERS, U.S. Pat. No. 3,698,798, INVENTED BY LAWRENCE A. BOLTON, which comprises a mirror mounted in a frame which is secured to a bumper-supported vertical post.

Another known prior art is a REAR VIEW MIRROR ASSEMBLY, U.S. Pat. No. 4,435,044, which comprises a first mirror mounted on the side of a vehicle, a second mirror mounted on an upper rear side portion of the vehicle and cooperating with the first mirror, and a third mirror positioned on top of the vehicle and being disposed such that the user can see what's reflected in all three mirrors.

Another known prior art is an AUXILIARY MIRROR SYSTEM, U.S. Pat. No. 4,664,489, which comprises a mounting bracket, a first and second attachment means secured to the mounting bracket, an elongated arm attached to the first attachment means, a mirror secured to the arm, a first brace member attached to the second attachment means, a second mounting bracket secured to the vehicle, and a second brace member connected to the second mounting bracket and to the arm, the mirror being extended outwardly from the vehicle.

Another known prior art is a MIRROR SYSTEM FOR A TRUCK, U.S. Pat. No. 5,119,241, INVENTED BY JOHN W. RUTTEN, which comprises a first mirror connected to a support which connected to the exterior of the top of the cab, a second mirror which is mounted on top of the cab, and a third mirror which extends upward above the cab, all three mirrors being arranged such that the user can view the image reflected in all three mirrors.

Each of the prior art above-described is very complex and in most instances difficult to even set up and is not easily adjustable, all of which are not problems of the present invention.

SUMMARY OF THE INVENTION

The present invention relates to an adjustable rear view mirror assembly for trucks which comprises a mirror rotatably mounted to an end portion of an elongated member which is slidably and rotatably mounted through a pair of sleeves which are fastenably attached to the frame of the conventional side mirror mounted to the side of the cab of a truck. The elongated member can be rotated by the user from within the cab and also moves the mirror which extends above the box on the truck and allows the user to see inside the box without having to depart from the cab to do so.

One objective of the present invention is to provide an adjustable rear view mirror assembly for trucks which can be easily adjusted by the user so that the user can see most any part of the inside of the truck box.

Another objective of the present invention is to provide an adjustable rear view mirror assembly for trucks which can be assembled quickly and is easy to use.

Also, another objective of the present invention is to provide an adjustable rear view mirror assembly for trucks which is less complex and more effective than any of the prior art.

Yet, another objective of the present invention is to provide an adjustable rear view mirror assembly for trucks which can be easily removed and stored until and when the user needs it again, which is not the case with any of the prior art.

Further objectives and advantages of the present invention will become apparent as the description proceeds and when taken in conjunction with the accompanying drawings wherein:

DETAILED DESCRIPTION OF THE INVENTION

Figure 1:
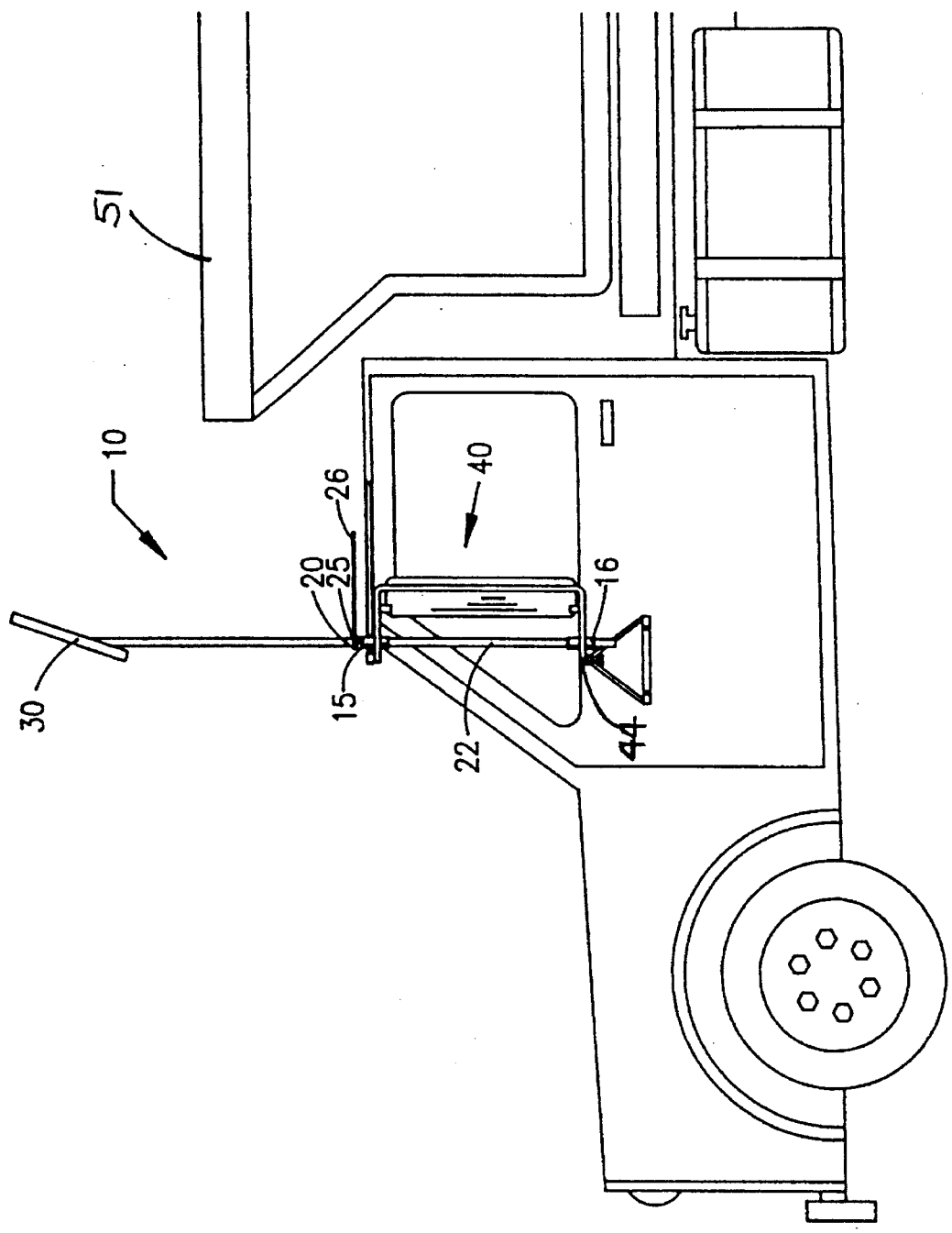
FIG. 1 is a side elevation view of the adjustable rear view mirror assembly with a portion of a truck body broken away to fully illustrate the mirror assembly in an operable position.
Figure 2:
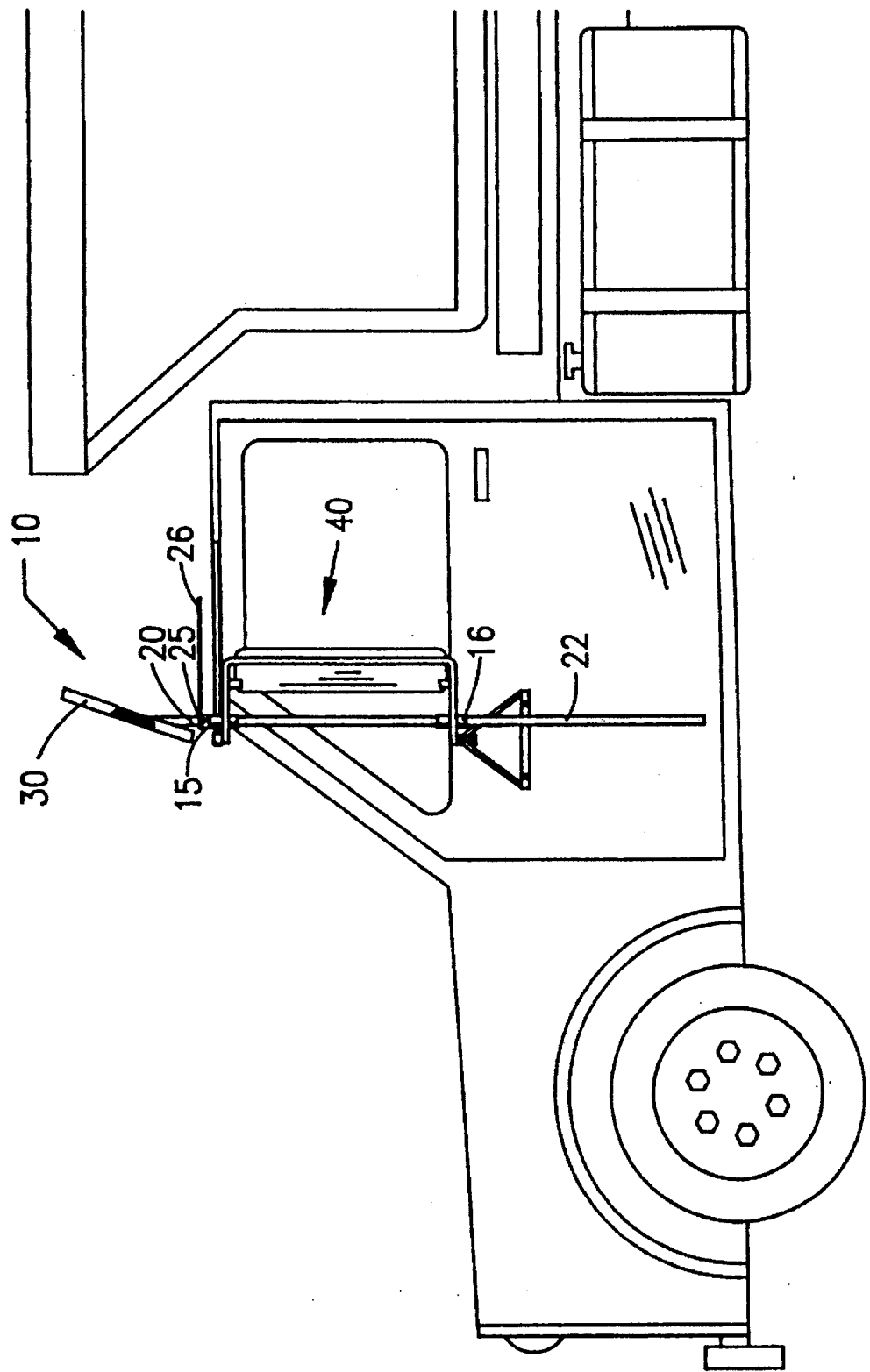
FIG. 2 is a side elevation view of the adjustable rear view mirror assembly with a portion of a truck body broken away, showing an alternate embodiment of the mirror assembly having a telescopic mirror support which is in a retracted nonoperable position.

Referring to the drawings in FIGS. 1–5, the adjustable rear view mirror assembly 10 for trucks comprises a pair of sleeves 15 & 16 each having a bracket 15a or 16a having an end which is fixedly attached to the exterior of the wall of the sleeve 15 or 16, each of the brackets 15a or 16a extending perpendicular from the respective sleeve 15 or 16 and having a hole through its other end. The brackets 15a & 16a are fastened or bolted to the frame 41 of a conventional side mirror assembly 40 on trucks 50, to where the existing mirror support 44 of a conventional side mirror assembly 40 is also fastened or bolted. The sleeves 15 & 16 depend from the brackets 15b & 16b and are disposed with the longitudinal axes of the sleeves 15 & 16 being generally perpendicular to the ground and being substantially vertically aligned to one another with one of the sleeves 15 being vertically aligned and above the other sleeve 16. The top sleeve 15 depends from the top 42 of the frame 41 and the bottom sleeve 16 depends from the bottom 43 of the frame 41 as shown in FIGS. 1 & 2. Each of the sleeves 15 or 16 also have a hole 15a or 16a extending through the wall and into the bore thereof.

Figure 3:
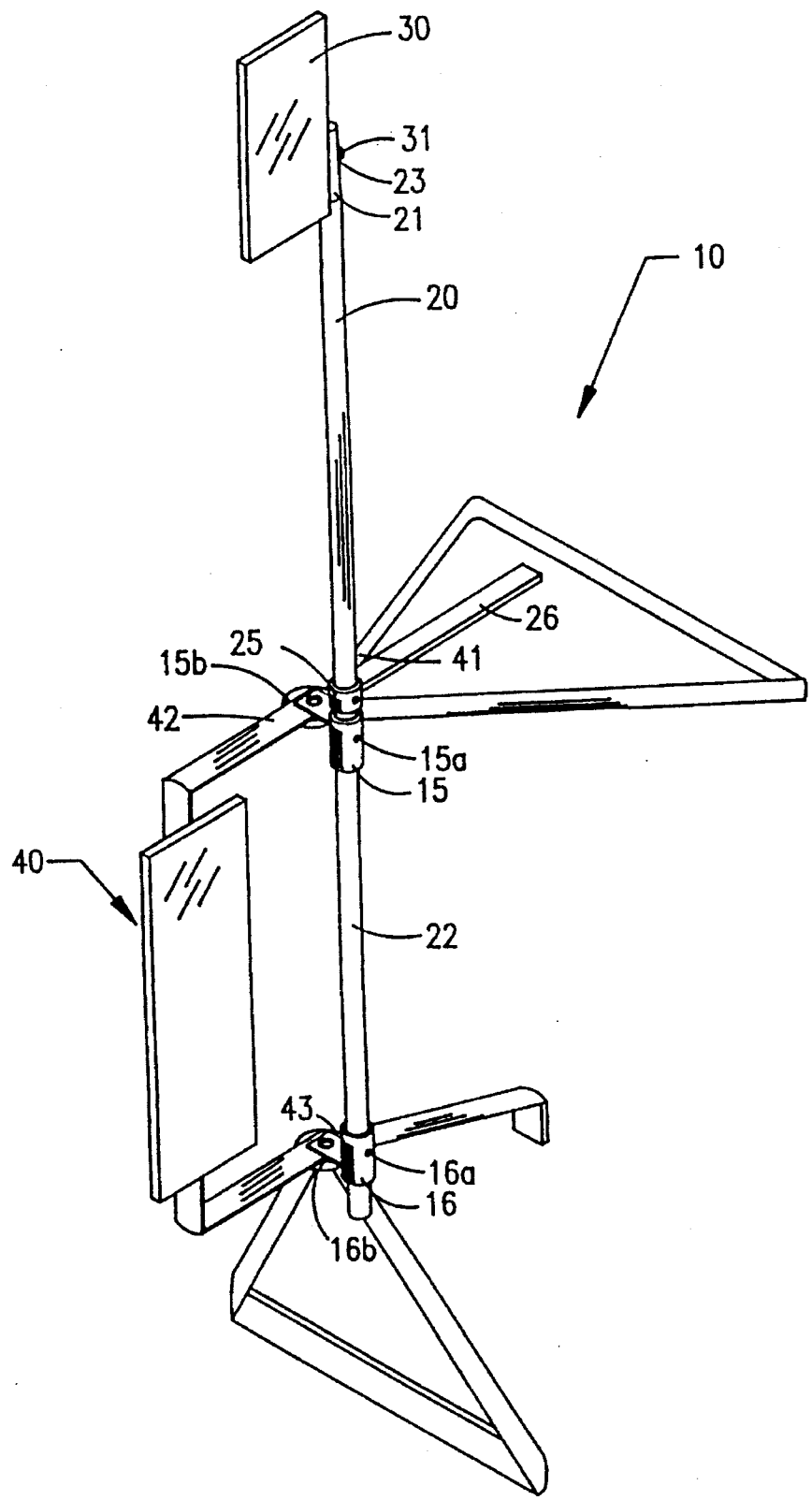
FIG. 3 is a perspective view of the adjustable rear view mirror assembly.
Figure 4:
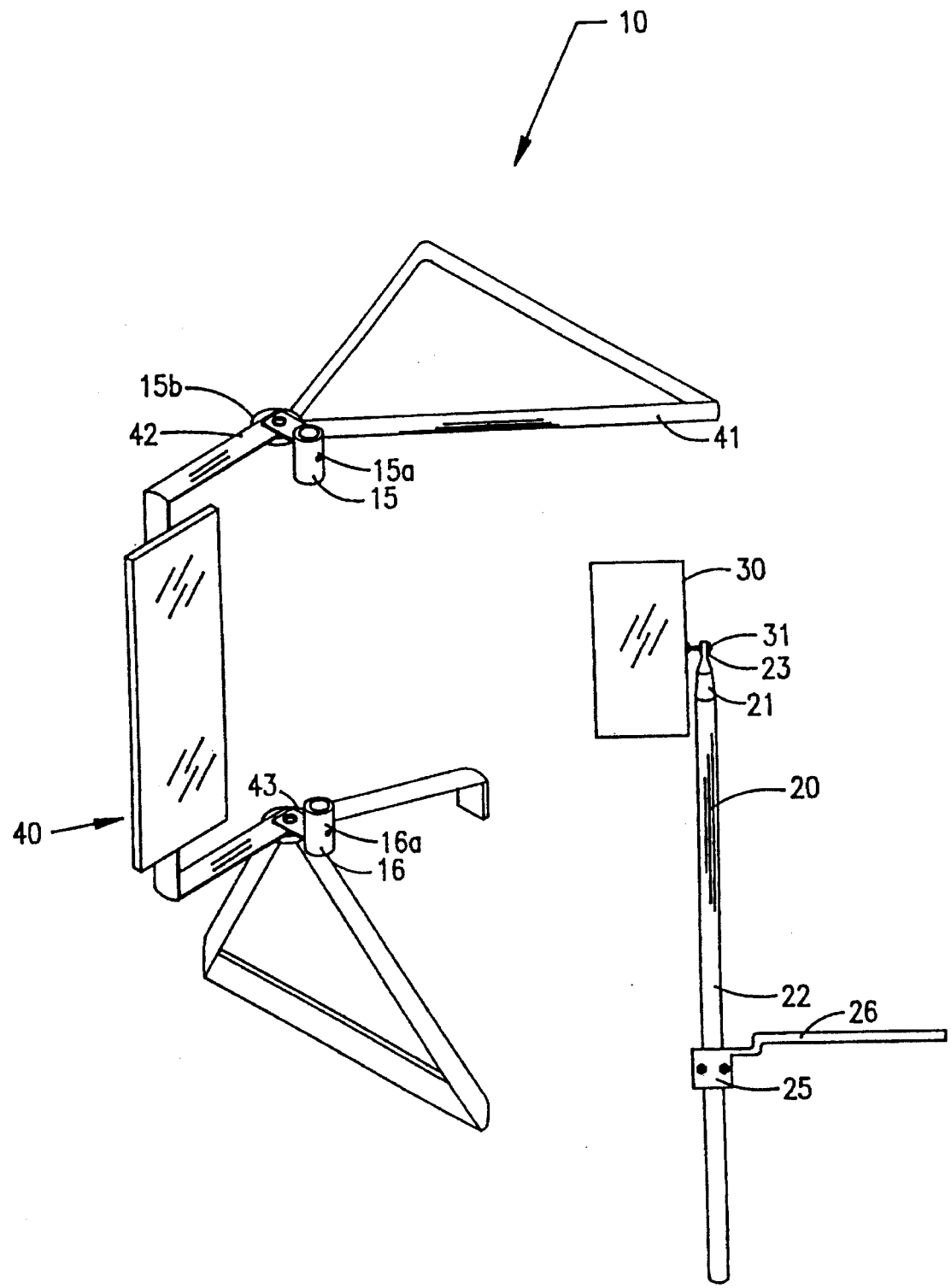
FIG. 4 is a perspective view of the adjustable rear view mirror assembly with the mirror support removed from the two sleeves.

As shown in FIGS. 1, 3, & 4, the adjustable rear view mirror assembly 10 also comprises an elongated mirror support 20 dimensioned to slidably and rotatably extend through the two sleeves 15 & 16 with the mirror support 20 further having a top end 21 and a lower portion 22. An eyelet member 23 extends from the top end 21 of the mirror support 20 which also has a pair of slots (not shown) in the lower portion 22 thereof, which are spaced apart along the mirror support 20 substantially the same distance as the two sleeves 15 & 16 when fastened to the frame 41 of the conventional side mirror assembly 40. Securing means such as pins (not shown) are used to limit the rotation of the mirror support 20 in the sleeves 15 & 16. The securing means are insertable in the hole 15a & 16a of the sleeves 15 & 16 and into the slots of the mirror support 20.

The adjustable rear view mirror assembly 10 further comprises a mirror 30 having a threaded pivot member 31 fixedly and centrally disposed in a side or edge of the mirror 30 and further extending outwardly from the mirror 30 which is fastened to the top end 21 of the elongate mirror support 20 with the threaded pivot member 31 extending through the eyelet member 23 and being fastened to the mirror support 20 with a threaded nut. The pivot member 31 is disposed in such a way which allows the user to adjust the angle of reflection or vertical pitch of the mirror 30 which is capable of being pivoted about a horizontal axis so that a user can selectively adjust the mirror 30 to any desired angle of reflection or vertical pitch. If the user wants to view more of the inside front of the truck box 51, the user can rotate the top portion of the mirror 30 toward the box 51. If the user wants to view more of the rear of the truck box 51, the user can rotate the top portion of the mirror 30 away from the box 51. The mirror support 20 being mounted in the two sleeves 15 & 16 is adapted to extend the mirror 30 above the top of the box 51, and can be adjusted vertically as desired by the user. An adjustable collar 25 is removeably engaged about the mirror support 20 to set the vertical height or extension of the mirror support 20. The adjustable collar 25 has a plurality of threaded holes spaced thereabout and extending through the sides thereof. Threaded fasteners are used to thread through the threaded holes to fasten to and engage the mirror support 20, and can be disengaged therefrom to allow the collar 25 to be moved along the length of the mirror support 20. A steering arm 26 is fixedly attached or welded to and extends outward from the collar 25 and is dimensioned to allow the user seated in the cab of the truck 50 to grasp it and to rotate the mirror 30 about a vertical axis to adjust the horizontal angle of reflection or pitch of the mirror 30 relative to the user so that the user, if so desired, can view all sides of the inside of the truck box 51.

The user can easily adjust the height of the mirror support 20 above the top of the truck box 51 by disengaging the threaded fasteners from the mirror support 20 and moving the adjustable collar 25 along the length of mirror support 20. The adjustable collar 25 is adapted to rest upon the top sleeve 15 which is removeably fastened to the top 42 of the frame 41 of the conventional side mirror assembly 40.

Figure 5:
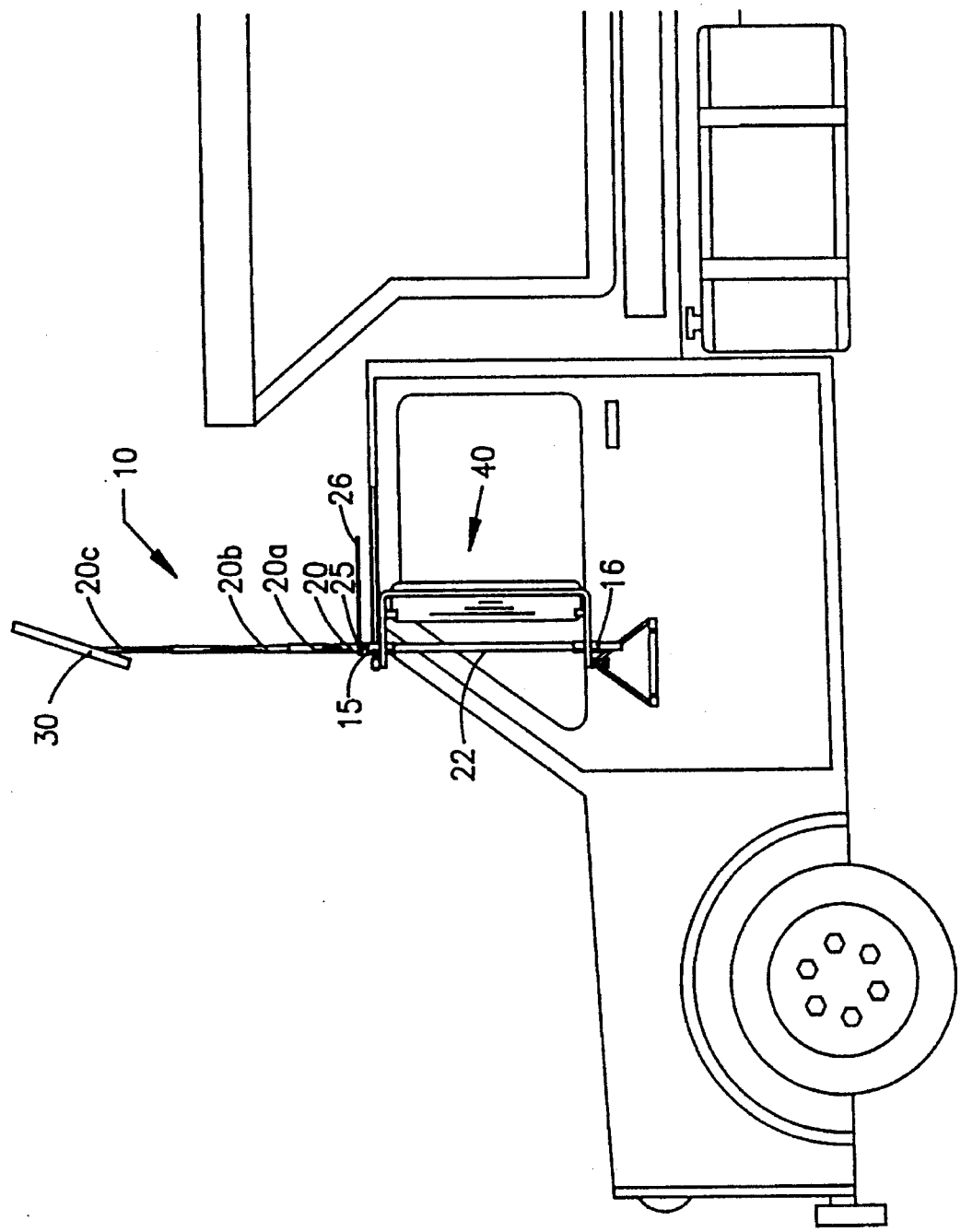
FIG. 5 is a side elevation view of the alternate embodiment of the mirror support which includes telescopic tubular members.

As an alternate embodiment, the mirror support 20, as shown in FIGS. 2 & 5, comprises a telescopic assembly of tubular members 20a, 20b, & 20c comprising a base member 20a which is removeably mounted in the two sleeves 15 & 16, a first extension member 20b which can be either extended from or retracted inside the base member 20a, and a second extension member 20c which can be either extended from or retracted inside the first extension member 20b. The eyelet member 23 extends from the distal end of the second extension member 20c. In operation, the extension members 20b & 20c are securingly extended above the base member 20a with a portion of the second extension member 20c and the mirror 30 securingly extending above the top of the truck box 51. When not in operation, the extension members 20b & 20c can be retracted inside the base member 20a which is secured to the sleeves 15 & 16 with the securing means and the adjustable collar 25 which is fastened about the base member 20a and rests upon the top sleeve 15 as shown in FIG. 2. The rear view mirror assembly 10 allows the user view all sides of the truck box 51 and can be easily assembled when used and quickly disassembled when not used unlike any of the known prior art.

Various changes and departures may be made to the invention without departing from the spirit and scope thereof. Accordingly, it is not intended that the invention be limited to that specifically described in the specification or as illustrated in the drawings but only as set forth in the claims:

What is claimed is:

1. An adjustable rear view mirror assembly for trucks comprising:

a pair of sleeves each having a bracket member fixedly attached thereto and removeably fastened to a frame of a conventional side mirror assembly on a truck, said sleeves being disposed in vertical relationship and alignment to one another, further said sleeves depending from said frame;

a mirror support having a top end and a lower portion which is slidably and rotatably mounted through said sleeves, said mirror support having a collar removeably fastened thereabout to adjustably set said mirror support in vertical relationship to a box of said truck, said mirror support further having an eyelet member at said top end, said mirror support being essentially telescopic tubular members capable of vertically extending above said box of said truck, said telescopic members including a base member which is slidably and rotatably mounted through said sleeves, a first extension member which is securingly extendable from and retractable into said base member, and a second extension member which is securingly extendable from and retractable into said first extension member; and a mirror having a pivot member fixedly and centrally disposed in a side of said mirror, said pivot member pivotably attached to said top end of said mirror support and received by said eyelet member, for vertically adjusting said mirror upon a horizontal axis.

2. An adjustable rear view mirror assembly for trucks comprising:

a pair of sleeves each having a bracket member fixedly attached thereto and removeably fastened to a frame of a conventional side mirror assembly on a truck, said sleeves being disposed in vertical relationship and alignment to one another, further said sleeves depending from said frame;

a mirror support having a top end and a lower portion which is slidably and rotatably mounted through said sleeves, said mirror support having a collar removeably fastened thereabout to adjustably set said mirror support in vertical relationship to a box of said truck, said collar being dimensioned and adapted to rest upon one of said sleeves and to hold said mirror support at selected adjustable vertical extensions, said collar being moveable and fastenable along a length of said mirror support, said collar further having a steering means fixedly attached thereto and extending outward therefrom, said steering means adapted and dimensioned to allow a user to rotate said mirror support and said mirror about a vertical axis so that said user can view essentially all of said box; and a mirror having a pivot member fixedly and centrally disposed in a side of said mirror, said pivot member pivotably attached to said top end of said mirror support and received by said eyelet member, for vertically adjusting said mirror upon a horizontal axis.

* * * * *